United States Patent [19]

Gestblom et al.

[11] 4,257,170
[45] Mar. 24, 1981

[54] TUMBLER DRYER

[75] Inventors: Barbro Gestblom; Christer Martinsson; Hakan Treijner, all of Lidköping, Sweden

[73] Assignee: Junga Verkstader AB

[21] Appl. No.: 86,023

[22] Filed: Oct. 17, 1979

[30] Foreign Application Priority Data

Oct. 19, 1978 [SE] Sweden .............................. 7810894

[51] Int. Cl.³ ............................................ F26B 21/10
[52] U.S. Cl. ........................................ 34/48; 34/55; 219/364
[58] Field of Search ............................. 34/48, 133, 55; 219/364

[56] References Cited

U.S. PATENT DOCUMENTS

| 3,302,299 | 2/1967 | Scherzinger | 34/48 |
|---|---|---|---|
| 3,699,665 | 10/1972 | Shinskey | 34/48 |
| 4,086,707 | 5/1978 | Bochan | 34/48 |

FOREIGN PATENT DOCUMENTS

| 930231 | 7/1963 | United Kingdom . |
|---|---|---|
| 990711 | 4/1965 | United Kingdom . |
| 1261361 | 1/1972 | United Kingdom . |
| 1470163 | 4/1977 | United Kingdom . |

Primary Examiner—Larry I. Schwartz
Attorney, Agent, or Firm—Pollock, Vande Sande & Priddy

[57] ABSTRACT

To secure a desired value, preferably adjustable in advance, of the moisture content at the end of the drying process, independent of the amount of articles to be dried and of the material of these articles, a tumbler dryer may be provided with a temperature sensor (G) which senses the temperature (T) of the exhaust air from the drum (TR). The tumbler dryer is provided with control members (S) which determine the value of the temperature at the time when the rate of increase of the temperature during the latter stage of the drying process starts increasing, and which terminates the supply of hot air to the drum when the temperature has risen by a preset amount, corresponding to the desired moisture content, above said value. (FIG. 1.)

4 Claims, 4 Drawing Figures

TUMBLER DRYER

BACKGROUND OF THE INVENTION

The present invention relates to a tumbler dryer with a container for articles to be dried (such as clothes or other fabrics), which is arranged to be traversed by hot air during the drying process and where, at the beginning of the drying process, the temperature of the exhaust air from the container increases relatively rapidly and thereafter increases more slowly or remains constant, and where, towards the end of the drying process, the rate of increase of the temperature starts increasing.

In tumbler dryers it is of importance to be able to terminate the drying process when the moisture content of the articles has reached the desired value. If the drying is interrupted too early, the moisture content is too high with the consequent apparent disadvantages. If the drying is interrupted too late, this involves an unnecessarily high energy consumption, and the too low moisture content of the articles will increase their propensity to wrinkle and make them difficult to iron, and further the risk of static electric charging of the articles will increase. There are therefore considerable advantages to be gained if the drying process can always be terminated at such a time that the dried articles have the desired moisture content. The desired value of the moisture content may vary between, for example, 1-3% (for normal dry laundry) and 8-11% (for iron dry laundry), depending on the subsequent treatment to which the dried laundry is intended to be subjected.

It is previously known to provide tumbler dryers with a simple time program which interrupts the drying after a preset time. Since the rate of drying is very much dependent on several factors, for example the amount of articles to be dried in the container and the material of the articles, it is impossible in practice to predict and set, in a certain case, the drying time which in that particular case gives the desirable moisture content. The dried laundry will therefore have too high or (more often) too low a moisture content, resulting in the above-mentioned disadvantages.

Further, it is known to arrange a temperature sensor which senses the temperature of the exhaust air from the drum-washer. When the tumbler dryer is started, this temperature first increases relatively rapidly and then becomes constant or increases more slowly, while the main portion of the water content of the laundry is driven off. Towards the end of the drying, the temperature starts rising again (or starts rising more rapidly). It is known to arrange members which are influenced by the temperature sensor and which automatically terminate the drying process (the supply of hot air to the drum) when the temperature of the exhaust air during the final stage of the drying has reached a predetermined value, for example 60° C., which may then be suitably selected so that a certain moisture content in the laundry is obtained at full load of the tumbler dryer. However, there is no clear relationship between moisture content and switch-off temperature, and therefore it is not possible in each individual case, by setting the switch-off temperature, to determine what moisture content the laundry will have at the end of the drying. Further, it has proved that when the drum of the machine is only partly filled, the drying will take place more rapidly, and when the exhaust air reaches the switch-off temperature, the moisture content of the laundry is considerably lower than what is the case at full load. At partial load, the drying will therefore be interrupted too late, which results in the disadvantages mentioned in the introduction.

It is also known to sense the temperature of the articles to be dried and the temperature of the air current, and terminate the drying when the difference between these two temperatures drops below a predetermined limit value. In another known method, the drying is terminated when the rate of change of the temperature of the articles or of the exhaust air exceeds a predetermined value. Both these methods involve the drawback that the moisture content of the articles towards the end of the drying becomes greatly dependent on the amount of articles in the container.

To avoid the drawbacks with the above-mentioned methods, it is known to arrange electrodes in the drum and measure the resistance between the electrodes continuously during the drying process. During the rotation of the drum the articles are brought into contact with the electrodes, and the measured resistance becomes dependent on the resistivity of the articles and thus on the moisture content of the articles. As the drying progresses the moisture content is reduced, the resistivity increases and thus the measured resistance value also increases. When this value has reached a predetermined level, the drying is interrupted. However, this method involves several disadvantages. Particularly at low moisture content, it is difficult or impossible to determine, with sufficient accuracy, the moisture content by measuring the resistance in the described manner. Further, the mechanical-electrical design will be complicated (slip rings are required for transmitting the measuring signal). In case of mixed load, for example synthetic and cotton garments, the synthetic garments will dry first. It has proved that in this case the drying is normally not interrupted until the last cotton garment has become dry. The synthetic garments will then become dried to too great an extent, and synthetic material is often very sensitive to this. Another disadvantage of the method of measuring resistance is that the measured resistance, in addition to being influenced by the moisture content of the articles, may also be greatly influenced by lime deposits, etc., on the measuring electrodes and by the conductivity and the degree of purity of the water.

The invention aims to provide a tumbler dryer in which, in a simple and reliable manner and with great accuracy, a preset moisture content of the articles is obtained at the end of the drying process. The resulting moisture content shall be able to be set at different values. It should, as far as possible, be independent of the amount of articles in the drum and of the material of the articles, and it should also be independent of the temperature of the inlet air, which may be influenced by variations in the mains voltage, etc.

What characterises a tumbler dryer according to the invention will be clear from the appended claims.

BRIEF DESCRIPTION OF THE DRAWINGS

In the following the invention will be described in greater detail with reference to the accompanying drawings.

DESCRIPTION OF THE PREFERRED EMBODIMENTS

Figure 1:
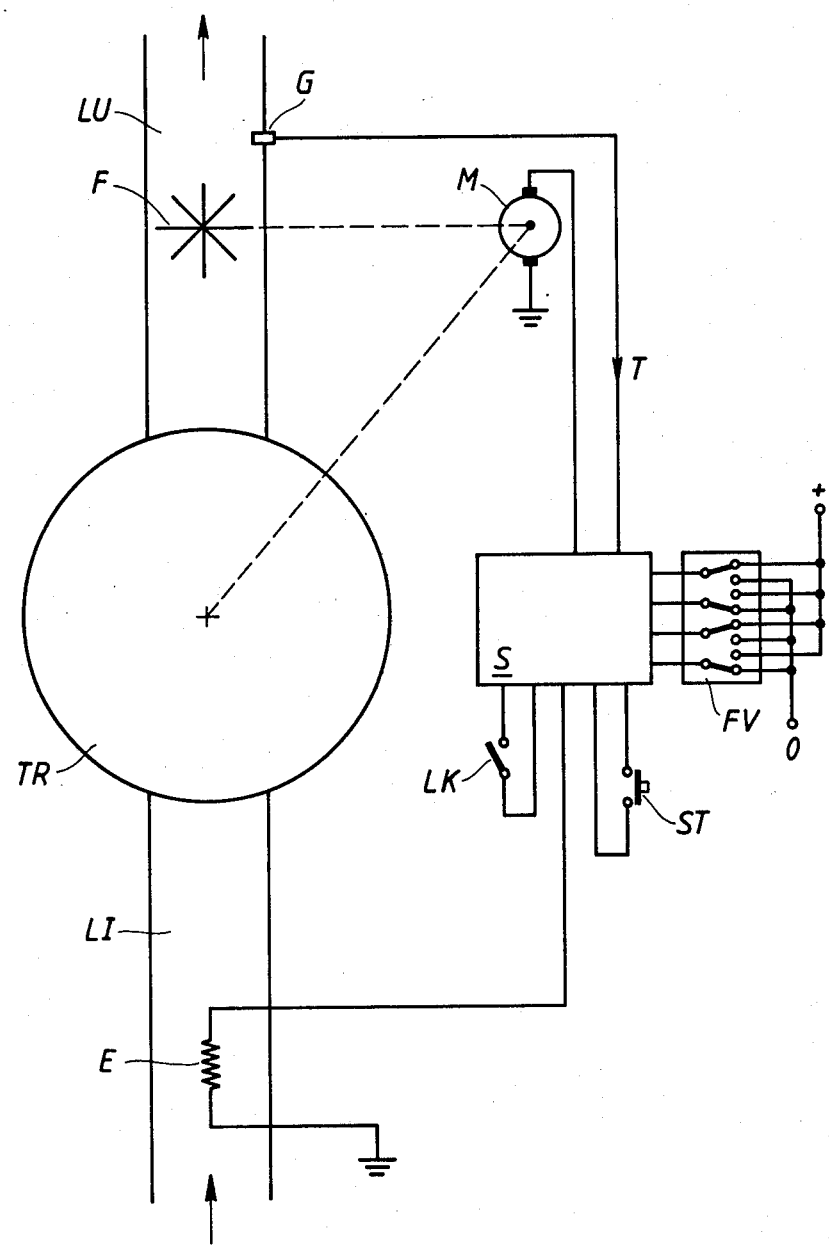
FIG. 1 shows schematically an example of a tumbler dryer according to the invention.

FIG. 1 shows a tumbler dryer with a container for articles to be dried in the form of the perforated rotary drum TR. The inlet air is supplied through an air channel LI and then passes through an electric heating element E. After passing through the drum TR, the air stream passes through the exhaust channel LU. A fan F is arranged in said channel, which fan drives the air stream through the channels and the drum. Further, a temperature sensor G is arranged at the exhaust channel LU. Said sensor may consist of a thermistor, a thermocouple or other suitable sensor, and it is located so as to emit a signal which is a measure of the temperature T of the exhaust air. The fan and the drum are driven by a common electric motor M which, as the element E, is supplied from a control unit S.

The operating members of the tumbler dryer are connected to the control unit and consist of a start button ST and a moisture selector FV. The latter is schematically shown as four switches activated by a common handle, or the like, each of said switches being able to assume two positions. In one position the switch supplies a positive voltage (which may be a logical "one") to the control unit S, and in the other position the switch supplies the voltage zero (a logical "zero"). With the help of the selector FV and its four switches, the desirable moisture content may be set at $2^4 = 16$ different positions. A microswitch LK is adapted to be influenced by the lid of the tumbler dryer and thus supplies the control circuits with information whether the lid is opened or closed.

Figure 2:
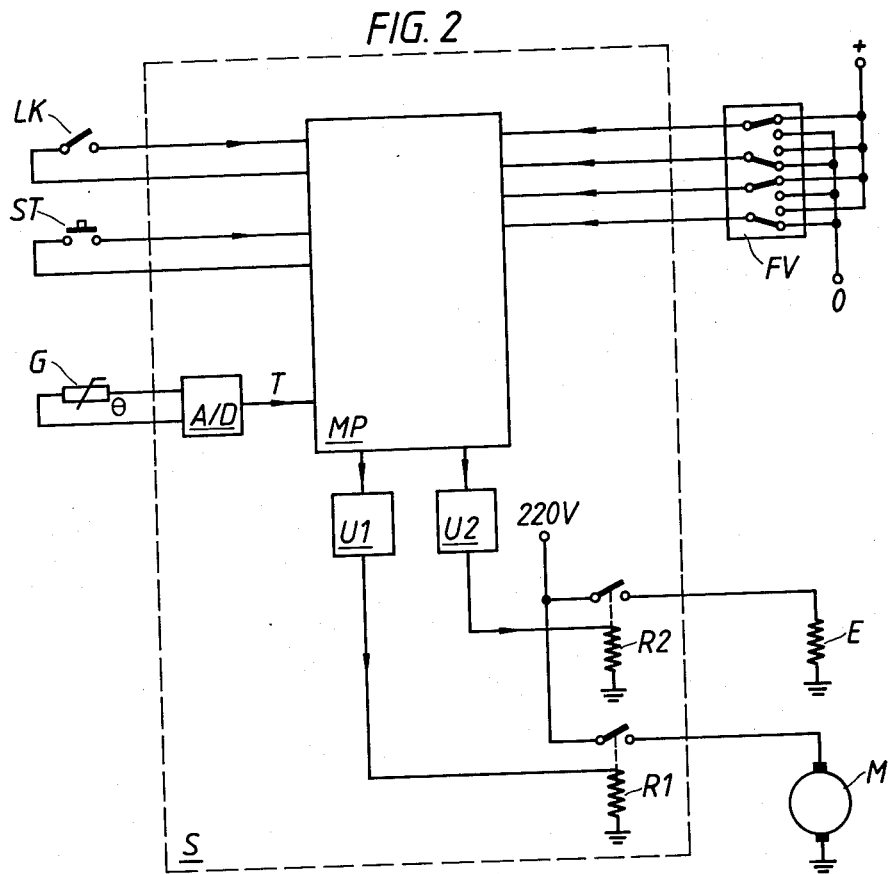
FIG. 2 shows in more detail the control circuits of the tumbler dryer according to FIG. 1.

FIG. 2 shows in more detail an example of the design of control unit S in FIG. 1. The core of the control unit is the microprocessor MP, for example of the Texas Instruments 9940 type. The processor receives information from the moisture selector FV about the set moisture content, from the lid switch LK, from the start knob ST and from the temperature sensor G about the temperature of the exhaust air. The sensor G is connected to the processor via an analog-digital convertor A/D. If necessary, of course, components LK, ST and FV may be connected to the processor via members which convert the signals from these components into signals adapted to the processor.

Figure 4:
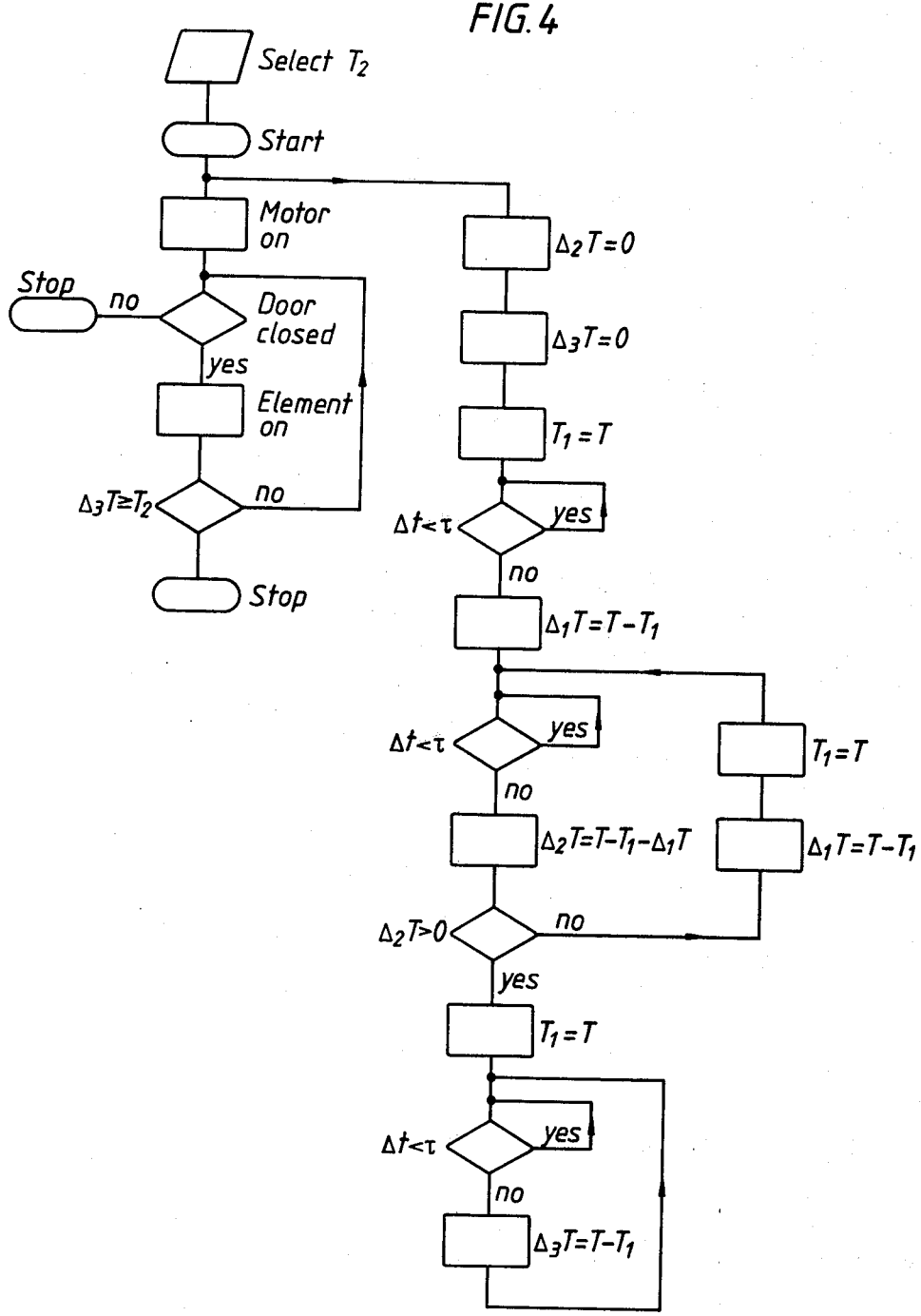
FIG. 4 shows an example of a flow chart for the program for the microprocessor included in the control circuits according to FIG. 3.

The processor is pre-programmed to store and process information from members FV, LK, ST and G (see further flow chart in FIG. 4 and, as a result, emit signals for switching on and off element E and motor M. These signals are emitted via output members U1 and U2 to contactors R1 and R2, by means of which the motor and the element may be connected or disconnected from the mains voltage (220 V). Output members U1 and U2 may comprise optoswitches for obtaining galvanic separation and amplifiers for operating the contactors. These are shown in FIG. 2 as electromagnetic electric switches, but as an alternative they may consist of static coupling members, for example thyristors.

Figure 3:
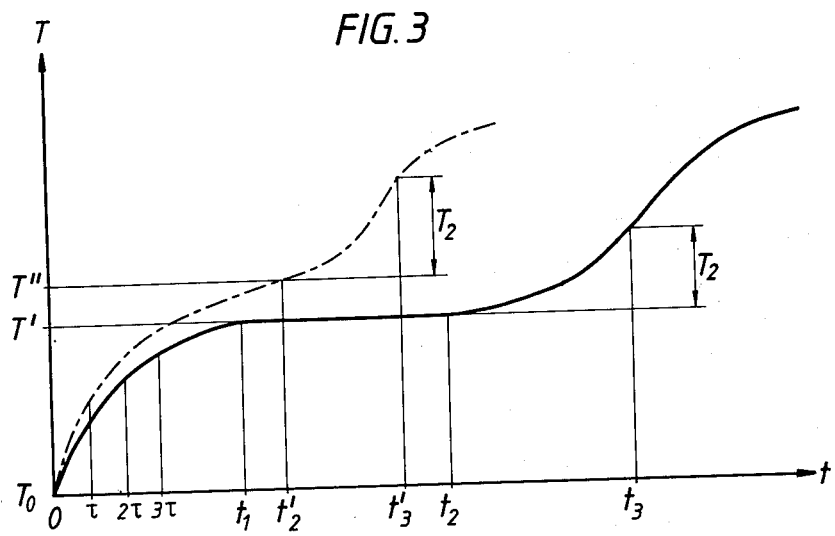
FIG. 3 shows the temperature of the exhaust air as a function of the time during a drying process.

FIG. 3 shows the temperature T of the exhaust air as a function of the time t during a drying procedure in a tumbler dryer. At t=O, the drying is started, the motor M and the element E are switched on, and a stream of hot air is blown through the drum TR. The temperature T of the exhaust air first increases relatively rapidly. According as the air channels, the drum and the articles are heated, the rate of increase of the temperature decreases and at time $t_1$ it reaches a relatively constant level T'. The continuous curve in FIG. 3 shows a typical characteristic at full load. For the time $t_1$-$t_2$, the main part of the water contents of the articles is driven off. When there is only a small amount of water left, the temperature T starts increasing (at $t=t_2$) and approaches a new limit value which is considerably higher than T' if the hot air injection is not interrupted.

If there is a smaller quantity of articles in the drum, the entire drying process proceeds more rapidly that what is shown in FIG. 3. Further, the interval $t_1$-$t_2$, at which the temperature T is constant, may be shortened or completely disappear (see the dash-dotted curve in FIG. 3). However, as in the continuous-line curve, the temperature first increases relatively rapidly, The rate of increase first decreases successively and then (at $t=t_2'$), when the major part of the water has been driven off, starts increasing again.

The invention is based on the realization that very considerable advantages are gained if the drying is terminated when the temperature has risen by a predetermined amount above the temperature which prevailed when the rate of increase of the temperature started increasing. The continuous-line full load curve in FIG. 3 shows that the rate of increase of the temperature starts increasing at $t=t_2$. The temperature (T') at this time is stored, and when (at $t=t_3$) the temperature has risen by a predetermined amount $T_2$ above the stored value, that is when $T=T'+T_2$, the supply of hot air to the drum is interrupted. At partial load, the temperature (T'') is in the same way stored at the time ($t_2'$) when the rate of increase of the temperature starts increasing, and when (at $t=t_3'$) the temperature has risen by the predetermined amount $T_2$ above the stored temperature T'', the supply of hot air is interrupted.

It has proved that, largely independent of the amount of the articles and the material included (synthetic fibres, cotton, etc.), there is a very good correspondence between the temperature increase $T_2$ in FIG. 3 and the moisture content of the articles at the end of the drying. By designing the tumbler dryer so that a value of $T_2$ may be set prior to the drying which corresponds to the desirable moisture content at the end of the drying and so that the drying process is interrupted when the temperature of the exhaust air has increased by the set amount above the temperature which prevailed when the rate of increase of the temperature started rising, it is thus possible to obtain a desired moisture content at all times with great accuracy, independent of the amount of articles and independent of the material or materials of which the articles consist. It has also proved that in this way the desired moisture content is obtained with great accuracy also at such variations of the temperature and velocity of the inlet air that may be caused by, for example, variations in the mains voltage.

It has been found that in a typical machine the following relationship prevails between moisture content and temperature increase $T_2$:

| moisture content percent | $T_2$ °C. |
|---|---|
| 1-3 | 15 |
| 8-11 | 3 |

| moisture content percent | $T_2$ °C. |
|---|---|
| 15 | 1 |

Thus, the moisture selector FV may be graded by moisture content or with another suitable text but be designed so that the microprocessor is supplied with a value of $T_2$ which corresponds to the set moisture content.

FIG. 4 shows an example of a flow chart for the program for the microprocessor MP in FIG. 2 and by means of which the tumbler dryer may be controlled so that the function according to the invention is obtained. First the desired value of $T_2$ is set by means of moisture selector FV, and then the start button ST is pressed. The program is then started and the motor M is switched on. Thereafter it is checked if the lid of the machine is closed. If that is the case, the element E is switched on. Thereafter it is checked whether the variable $\Delta_3 T$ is greater or equal to the set amount $T_2$. This variable is (see further below) equal to the temperature increase above the temperature (e.g. T′ or T″ in FIG. 3) at which the rate of increase of the temperature starts rising. $\Delta_3 T$ is set to zero at the beginning of the program and therefore $\Delta_3 T < T_2$ until the drying process is to be terminated. The program therefore returns to the control "Lid closed" and runs around this loop until $\Delta_3 T \geq T_2$, when the program goes to "Stop", element E and motor M then being switched off. If, before this, the program finds out that the lid is not closed, the program also proceeds to "Stop", and the motor and the element are switched off.

In addition to the main program described above, the program also includes a calculating program for calculating the variable $\Delta_3 T$. This program is also started when the start button is activated. The program is arranged to sense the temperature T at times 0, $\tau$, $2\tau$, $3\tau$, etc. (see FIG. 3), that is, the sampling interval is $\tau$. $\tau$ may, for example, be 10 seconds. The calculating program operates with the following variables:

T—temperature at the time of sensing.
$T_1$—temperature at the preceding sensing occurrence.
$\Delta_1 T$—immediately preceding value of the temperature increase during a sampling interval.
$\Delta_2 T$—the difference between the last and the immediately preceding value of the temperature increase during a sampling interval.
$\Delta_3 T$—the difference between the present temperature and the temperature (e.g. T′ in FIG. 3) at which the rate of increase of the temperature starts increasing.
$\Delta t$—time elapsed since the immediately preceding sensing of the temperature.

Upon starting, i.e. at $t=0$, the variables $\Delta_2 T$ and $\Delta_3 T$ are set to zero, and $T_1$ is set equal to T. For as long as $\Delta t < \tau$ ($\tau$ is the sampling interval, see FIG. 3) thereafter, the program runs around in a loop. At $t=\tau$, $\Delta t = \tau$ and the program computes and stores $\Delta_1 T = T - T_1$, which is the temperature increase during the first sampling interval. After the time $\Delta$, i.e. at $t=\tau$ the program proceeds and computes $\Delta_2 T = T - T_1 - \Delta_1 T$. $T - T_1$ is the temperature increase during the interval $t=\tau$ until $t=2\tau$. $\Delta_2 T$ is an approximate measure of the second differential of the temperature with respect to the time. Since the temperature at the initial stage increases successively slower, $\Delta_2 T$ is negative at this stage. The condition $\Delta_2 T > 0$ is therefore not fulfilled and the program takes the right-hand direction in the figure and stores the current values of $\Delta_1 T$ and $T_1$. After the time $\tau$, i.e. at $t=3\tau$, a renewed computation of $\Delta_2 T$ is made. For as long as $\Delta_2 T \leq 0$, the program runs around once every sampling interval in the loop now described. At $t=t_2$ (or $t=t_2'$) in FIG. 3, however, the rate of increase of the temperature starts increasing. $\Delta_2 T$ then becomes positive and the program continues downwards in FIG. 4. First $T_1 = T$ is set, that is, the stored value of the variable $T_1$ constitutes the temperature level (T′ or T″ in FIG. 3) above which the temperature increase $T_2$ shall be measured. The program therefore enters a closed loop and causes the quantity $\Delta_3 T$ to become computed once every sampling interval. For $\Delta_3 T$, $\Delta_3 T = T - T_1$, where $\Delta_3 T$ is a measure of the temperature increase above the reference level stored as the variable $T_1$.

When $\Delta_3 T$ amounts to the set value of $T_2$, the drying is interrupted in the manner described above with reference to the description of the main program.

The above-described embodiment of a tumbler dryer according to the invention is merely an example and many other embodiments are feasible within the scope of the invention. The computing program for fixing the time at which the rate of increase of the temperature starts rising may, of course, be different from that described above and may, for example, be made more sophisticated such that the effect of minor random temperature fluctuations is eliminated. Similarly, the program of the machine may be extended so that only the element E is switched off at time $t_3$ ($t_3'$) in FIG. 3. After this time, thus, non-heated air is blown through the drum, thus cooling the articles. The machine may then be arranged to stop when the temperature of the exhaust air has dropped to a suitable predetermined value, for example 25° C. Possibly, this cool-down stage may be succeeded by a stage at which the motor is run intermittently during short intervals to prevent wrinkling of the articles.

We claim:

1. In a tumbler dryer of the type having a container for articles to be dried, through which container hot air traverses during the drying process so that the temperature of the exhaust air from the container initially rises relatively rapidly, thereafter rises more slowly or remains constant and finally rises at an increasing rate toward the end of the drying process, the improvement comprising:
    means for sensing the temperature of the hot air leaving the container; and
    means responsive to said temperature sensing means for terminating the supply of hot air to the container when the temperature has risen by a predetermined amount above the temperature which existed at the time when the rate of rise of the temperature started to increase.

2. The improvement of claim 1, further comprising means for setting said predetermined amount at a desired value.

3. The improvement according to claim 1, wherein the dryer includes a fan arranged to generate an airstream through the container and an electric heating element arranged in the airstream before the container and the improvement further comprises means for terminating the supply of electric current to said element in order to terminate the supply of hot air to the container.

4. In a tumbler dryer of the type having a container for articles to be dried, through which container hot air traverses during the drying process so that the temperature of the exhaust air from the container initially rises relatively rapidly, thereafter rises more slowly or remains constant and finally rises at an increasing rate toward the end of the drying process, the improvement comprising:

means for sensing the temperature of the hot air leaving the container; and means responsive to said temperature sensing means for terminating the supply of hot air to the container when the temperature has risen by a predetermined amount above the temperature which existed at the time when the rate of rise of the temperature started to increase, said terminating means comprising calculating means connected to said temperature sensing means for continuously periodically calculating the rate of rise of the temperature, for comparing the rate of rise with the preceding value of the rate of rise, for storing the value of the temperature existing when the calculated rate of rise exceeds the preceding value of the rate of rise, and for comparing the temperature of the exhaust air with a temperature which exceeds the stored temperature by said predetermined amount.

* * * * *